Nov. 21, 1933.    H. L. PALMER    1,936,407
ELECTRICAL CONTROL CIRCUIT
Filed Sept. 24, 1931
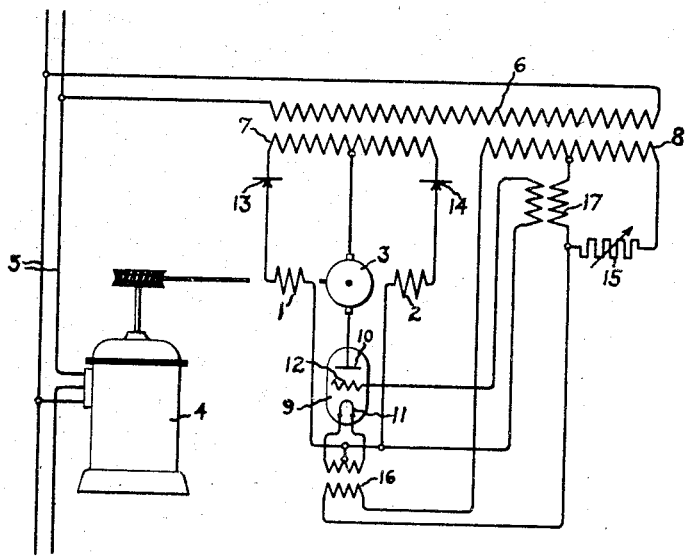
Inventor:
Harry L. Palmer,
by Charles V. Tulla
His Attorney.

Patented Nov. 21, 1933

1,936,407

UNITED STATES PATENT OFFICE 1,936,407

ELECTRICAL CONTROL CIRCUIT

Harry L. Palmer, Scotia, N. Y., assignor to General Electric Company, a corporation of New York Application September 24, 1931
Serial No. 564,892

8 Claims. (Cl. 171—119)

My invention relates to electrical control circuits and more particularly to simple static means for selectively controlling the energization of a plurality of electric circuits, or electro-responsive devices.

There are many cases where it is desirable to control selectively the energization of a plurality of electric circuits, or electro-responsive devices such, for example, as relays, signals, dynamo-electric machine field windings, etc There are, of course, many ways of doing this, perhaps the simplest of which is by the use of an ordinary single pole, double throw switch. However, if such a switch is to be operated automatically it requires auxiliary operating means such as electro-magnets, motors, or other motion producing means which are subject to wear and many other occasional well known operating difficulties. Furthermore, switch contacts, in time, tend to make poor contact unless they are periodically cleaned, due to sparking or arcing which pits and burns them and to foreign matter which is likely to collect on them. Numerous refinements have been and can be made in control arrangements which in their operating principle are fundamentally the same as a simple, single pole, double throw switch. One such arrangement is to utilize a pair of controlled electric valves as the equivalent of such a switch. In this arrangement each electric valve acts as a single pole, single throw switch. Thus by selectively controlling the conductivity of each valve, separate circuits completed through each valve may be selectively controlled.

In accordance with my invention I provide extremely simple circuit controlling means for a plurality of electric circuits whereby these circuits may be selectively energized in a novel manner. My invention is particularly adapted to controlling selectively a plurality of circuits which are energized from an alternating current source, or sources, and it requires the use of but a single controllable electric valve or its equivalent. By controllable electric valve I mean a device having an anode, a cathode and a control electrode which controls the current which can only flow through the valve in one direction, that is to say, from its anode to its cathode. Broadly speaking the illustrated embodiment of my invention consists in supplying, through a single electric valve, two or more unidirectional conducting electric circuits with current produced by out of phase alternating potentials respectively and selectively varying the conductivity of the valve in accordance with the phase of any one of these potentials.

It is an object of my invention to provide a new and improved electrical control arrangement.

Another object of my invention is to provide simple static means including not more than a single electric valve for selectively controlling the energization of a plurality of electric circuits or electro-responsive devices.

My invention will be better understood from the following description taken in connection with the accompanying drawing and its scope will be pointed out in the appended claims.

In the single figure of the accompanying drawing I have illustrated diagrammatically an embodiment of my invention for selectively controlling the energization of a pair of reversing field windings 1 and 2 of pilot motor 3 which is arranged to operate a single phase induction voltage regulator 4 connected to a single phase feeder circuit 5. A supply transformer having a primary winding 6 connected across the feeder circuit 2 is provided with a pair of separate secondary windings 7 and 8 which are arranged respectively to supply power for pilot motor 3 and to control automatically the selective energization of the field windings 1 and 2. An electrical circuit controller which is the equivalent of a simple, single pole, single throw switch is connected in series with the armature of motor 3. I prefer to employ a simple three-element electric valve 9 having an anode 10, a cathode 11 and a control electrode 12 although it should be understood that my invention is not limited to the use of such an electric valve and that any other equivalent circuit controller may be employed. Valve 9 may be either of the vapor electric discharge type or of the high vacuum pure electron discharge type, although I prefer to employ the former type because of its greater efficiency for power purposes. Asymmetrical conducting devices 13 and 14 are connected in circuit with windings 1 and 2 respectively and these devices are so connected as to prevent the flow of current through a series circuit including these two devices and these two windings. My invention is not limited to the use of any particular kind of asymmetrical conducting device and one such device which I find it convenient to use is the well known copper oxide type half wave rectifier. As shown in the drawing, I connect the armature of motor 3 and valve 9 in series in a circuit connecting an intermediate potential point of winding 7 with the circuit including the windings 1 and 2 and rectifiers 13 and 14 in series. As the rectifiers 13 and 14 are shown connected in such manner that current can only flow through windings 1 and 2 towards the respective ends of winding 7 to which they are connected I connect the anode of valve 9 to the armature of motor 3 and the cathode 11 of this valve to the circuit including the windings and rectifiers so that current may flow through the armature of motor 3, the valve 9 and either winding 1 and rectifier 13 or winding 2 and rectifier 14 depending upon when valve 9 is rendered conductive.

It should be noted that the two circuits containing winding 1 and rectifier 13, on the one hand, and winding 2 and rectifier 14, on the other hand, and having the armature of motor 3 and the valve 9 in common are each energized by potentials which are out of phase with each other. In the particular arrangement shown these potentials are in phase opposition. That is to say, they are 180° out of phase with each other. Now by rendering valve 9 conductive when the potential of the circuit including this valve and winding 1 is such as to tend to cause a current to flow therethrough and through rectifier 13, current may be made to flow in this circuit, while if valve 9 is rendered conductive during the time when the potential of the circuit including this valve and winding 2 is such as to tend to force current through this circuit and through rectifier 14 current can be made to flow through this latter circuit. A convenient way of securing such control is to impress upon the grid, or control electrode, 12 an alternating potential which can be so controlled that it can be made, selectively, in phase with the potentials of either one of these circuits.

Associated with secondary winding 8, I have illustrated one means for automatically controlling the grid 12 in the above manner in response to the voltage of circuit 5. This particular means is disclosed and claimed in my Patent No. 1,847,893, granted March 1, 1932, and assigned to the assignee of the present application. It operates on the principle of a voltage responsive bridge circuit which has as one of its elements the filamentary cathode of the electric valve, which filamentary cathode has an appreciable temperature coefficient of resistance. This arrangement consists essentially of a Wheatstone bridge, two arms of which comprise respectively, an adjustable resistance 15 and the cathode 11 of the valve 9, which is connected in circuit with resistance 15 through a filament transformer 16. This transformer and resistance 15 are connected in series across winding 8. The two halves of winding 8 comprise the other two arms of this bridge and a grid transformer 17 is connected between the midpoint of this winding 8 and a point between resistance 15 and the primary winding of filament transformer 16. If now the value of the resistance of filament 11 is equal to the resistance 15, the two ends of the primary winding of grid transformer 17 will be at equipotential points and no potential will be applied to the grid 12. If, however, the resistance of filament 11, or the resistance of resistance element 15, should be changed, the potential of the point between these elements, to which the primary winding of transformer 17 is connected, would no longer be at the same instantaneous potential as the midpoint of winding 8. Consequently, an alternating potential would be applied to the terminals of transformer 17 and this will be transformed by the grid transformer 17 and applied to grid 12. Depending upon whether the resistance of filament 11 is greater or less than the resistance of element 15, the instantaneous polarity of transformer 17 may be reversed, that is to say, its phase may be shifted through 180°. As the potentials induced in windings 7 and 8, taken as a whole, are in phase with each other it will be clear that by shifting the phase of the potential of grid 12 through 180° it may be made in phase, selectively, with the potentials applied to the circuits including windings 1 and 2, which circuits have in common the valve 9 and the armature of motor 3.

The operation of the above described arrangement is as follows. With normal voltage on circuit 5 resistance 15 is so adjusted that it just equals the value of the resistance of cathode, or filament, 11. Under these circumstances no potential is applied to grid 12 and consequently valve 9 is non-conducting and no current flows in the armature of motor 3 or in either of its field windings. Assume now that the voltage of circuit 5 should fall due, for example, to the increase in voltage drop in this circuit which may be occasioned by an increase in load thereon. Under these circumstances, assuming that cathode 11 has a positive temperature coefficient of resistance, as will usually be the case, the current flowing through it will decrease, due to the decreased potential applied thereto, which potential is transmitted through transformer windings 6, 8 and filament transformer 16. The resistance of this cathode element will therefore increase relatively to the resistance of element 15, which is an ordinary resistance element having relatively small temperature coefficient of resistance. This will result in an unbalance of the bridge circuit, as is well understood by those skilled in the art, and an alternating potential will be applied through the grid transformer 17 to grid 12. By suitably selecting the connections of grid transformer 17 this potential may be made to coincide with the potential which is normally acting to force current through the circuit containing the field windings which, when energized, operates the motor 3 in a manner to cause regulator 4 to increase the voltage of circuit 5. Assume, for example, that this winding is winding 1 and that the connections of grid transformer 17 are so chosen that when the electrical midpoint of winding 7 is positive with respect to the left-hand end of this winding grid 12 is positive. Under these circumstances half wave current will be transmitted through the armature of motor 3, valve 9, field winding 1 and rectifier 13. No current will flow through winding 2 because during the opposite half cycle when the electrical midpoint of winding 7 is positive with respect to the right-hand end of this winding the grid 12 will be negative and consequently will prevent the flow of current. Under the above circumstances motor 3 will operate in a manner to cause regulator 4 to increase the voltage of circuit 5. After a predetermined time the necessary correction will be made and circuit 5 will have its voltage restored to normal. As soon as the voltage returns to normal the grid circuit will again become balanced and as grid 12 will now become deenergized motor 3 will stop. Assume now that the voltage of circuit 5 rises above normal. Due to the increased energization of filament 11 due to this rise in voltage, the bridge will become unbalanced in an opposite direction and consequently grid 12 will be energized by a potential which is 180° out of phase with the potential which is applied thereto when the voltage of circuit 5 is below normal. Obviously, therefore, grid 12 will now be positive with respect to the cathode 11 at the times when the electrical midpoint of winding 7 is positive with respect to the right-hand end of this winding. Consequently current will now flow through the armature of motor 3, valve 9, field winding 2 and rectifier 14. Winding 2 is so arranged as to cause a reverse operation of motor 3 from that which was previously described and consequently regulator 2 will be operated in the reverse direction to lower the voltage of circuit 5. This action will continue until normal voltage is restored when the grid circuit will again be balanced and motor 3 will be stopped.

It will thus be seen that by selectively controlling the alternate half cycles during which valve 9 is made conductive it is possible to selectively control the energization of the field windings 1 and 2.

While I have shown and described a particular embodiment of my invention it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a plurality of unidirectional conducting circuits, means for energizing said circuits with out of phase alternating potentials respectively, a circuit controller common to a plurality of said circuits, and means for selectively rendering said controller conductive during the periods when current can flow in said respective circuits.

2. In combination, a source of alternating current, a plurality of electric circuits, asymmetrical conducting means connected in said circuits, said circuits being connected to said source so as to be energized by out of phase potentials thereof, a circuit controller common to said circuits, and means for selectively rendering said circuit controller conductive during half cycles of said source which are in phase with the respective potentials of said circuits.

3. In combination, a source of alternating current, a pair of circuits connected to be energized from said source, asymmetrical conducting devices connected respectively in said circuits in such a manner that said respective circuits are made conductive only during different alternate half cycles of said source, circuit controlling means common to both circuits, and means for selectively making said circuit controlling means conducting during different alternate half cycles of said source.

4. In combination, a source of alternating current, a pair of circuits connected to be energized therefrom, a grid controlled electric valve, means connecting said valve to control selectively the flow of current in said circuits in accordance with whether its grid potential is in phase or in phase opposition with said source of alternating current, and means for shifting the phase of the grid potential of said valve from in phase to phase opposition with said source.

5. In combination, an alternating current winding, an electric valve having a control electrode, a pair of electro-responsive load devices, a pair of half wave rectifiers, a series circuit including said valve, one of said devices and one of said rectifiers being connected between the electrical midpoint of said winding and one end thereof, a second series circuit including said valve, the other electro-responsive device and the other rectifier being connected between said midpoint and the other end of said winding, and means for selectively impressing on said control electrode a potential which is in phase with the potential of each of said circuits.

6. In combination, an alternating current winding, a pair of circuits energized therefrom, said circuits being connected respectively to two different potential points in said winding, said circuits having a common conductor connected to an intermediate potential point in said winding, load devices connected in said circuits, asymmetrical conducting devices connected in said circuits, an electric valve connected in said common conductor, said valve having a control electrode, and means for shifting the phase of the potential of said electrode whereby said circuits may be selectively energized.

7. In combination, an alternating current winding, a dynamo electric machine having a pair of field windings, a pair of half wave rectifiers, a series circuit including said field windings and said rectifiers in opposition connected between the ends of said alternating current winding, an electric valve connected between the electrical midpoint of said alternating current winding and a point in said series circuit which has one field winding and one rectifier between it and each end of said alternating current winding, and means for selectively controlling the flow of current through said valve and one or the other of said field windings.

8. In combination, an alternating current winding, a reversible direct current motor having an armature and a pair of field windings, a pair of half wave rectifiers, an electric valve, a series circuit between the electrical midpoint of said alternating current winding and one end of said winding which includes said armature, said valve, one of said field windings and one of said rectifiers, a second circuit between said midpoint and the other end of said alternating current winding which includes said valve, said armature, the other field winding and the other rectifier, said rectifiers being connected in opposition with respect to the circuit between the two ends of said alternating current winding, and means for selectively rendering said valve conductive at times when it is possible for current to flow through one or the other of said two first mentioned circuits.

HARRY L. PALMER.